United States Patent [19]
Church et al.

[11] Patent Number: 5,696,936
[45] Date of Patent: Dec. 9, 1997

[54] LOW LATENCY MESSAGE PROCESSOR INTERFACE USING MEMORY MAPPED READ/WRITE WINDOWS

[75] Inventors: Craig R. Church, Havertown; Duane J. McCrory, Malvern; Joseph S. Schibinger, Phoenixville, all of Pa.; Laurence P. Flora, Valley Center, Calif.

[73] Assignee: Unisys Corporation, Blue Bell, Pa.

[21] Appl. No.: 428,054

[22] Filed: Apr. 25, 1995

[51] Int. Cl.$^6$ .................................................. G06F 12/08
[52] U.S. Cl. ........................ 395/465; 395/200.2; 395/481
[58] Field of Search ............................... 395/458, 476, 395/200.02, 200.2, 800, 462, 445, 460, 465, 481, 486

[56] References Cited

U.S. PATENT DOCUMENTS 5,301,186  4/1994  Galuszka et al. ...................... 370/24
5,537,561  7/1996  Nakajima ............................. 395/375

OTHER PUBLICATIONS

Motorola, "MC88110 Second Generation RISC Microprocessor User's Manual" pp. 11-58 to 11-59, 1991.

*Primary Examiner*—Eddie P. Chan
*Assistant Examiner*—Kevin L. Ellis
*Attorney, Agent, or Firm*—John B. Sowell, Esq.; Mark T. Starr, Esq.; John F. O'Rourke, Esq.

[57] ABSTRACT

A low latency software and hardware interface between a microprocessor and Network Interface Unit is disclosed. The Network Interface Unit interfaces to the microprocessor's Level 2 cache interface, which provides burst transfers of cache lines between the microprocessor and Network Interface Unit. The Network Interface Unit is memory mapped into the microprocessor's address space. Two memory mapped cache lines are used to write commands to the Network Interface Unit's Write Window and another two cache lines are used to read results of the commands from the Network Interface Unit's Read Window. The Write Window is a three port register file. Data is written into one write port and read simultaneously from two read ports. One read port is used during read operations to the Write Window while the other is used during command execution to move data to the Internal Structures block. The Read Window is a 2-1 multiplexor that is 128 bits wide. On a read operation data may be selected from the Write Window or the Internal Structures.

12 Claims, 3 Drawing Sheets

LOW LATENCY MESSAGE PROCESSOR INTERFACE USING MEMORY MAPPED READ/WRITE WINDOWS

FIELD OF THE INVENTION

The present invention relates generally to computer systems, and more particularly to a low latency interface useful in a computer.

BACKGROUND OF THE INVENTION

The present invention was developed during the process of designing a massively parallel, high speed computer system of the type depicted schematically in FIG. 1. This system comprises a tree-structured interconnecting network 10 referred to as a "Fat Tree"; a plurality of nodes 12 each containing one or more processors; and a plurality of links 14 connecting the nodes 12 to the Fat Tree 10. The Fat Tree 10 and links 14 permit the nodes to communicate with each other. The present invention particularly relates to an interface between the nodes 12 and links 14, e.g., in the circled region 16 of FIG. 1.

Bandwidth and latency are two important parameters that must be considered when defining a bus or network interface. Bandwidth is a measure of the quantity of data that can be transferred across the interface per unit time, and is important because the interface connecting the processors to the network can create a bottleneck through which all transactions must pass. A large-bandwidth interface is important to the overall speed of the computer system. Latency represents the time it takes to transfer data across the interface, and thus the latency associated with an interface should be minimized. In the system for which the present invention was initially developed, the required bandwidth was 200 MB/sec and the required latency was 1 96-byte message/µs (or 1 Mmsg/s).

Referring to FIG. 2, a node may comprise one or more Memory Controllers 20, Processing Modules 22, and Message Processing Modules 24. In the example of FIG. 2, the Message Processing Module 24 connects directly to one port of each Memory Controller 20. In single domain configurations, one Message Processing Module 24 is connected to form one clustered node. In dual domain configurations of the type depicted in FIG. 2, two Message Processing Modules are connected to form two clustered nodes. It should be noted that the node of FIG. 2 is but one example of a node in which the present invention can be employed, and thus the description of this node is by no means intended to imply that the invention is limited to applications involving this specific node.

FIG. 3 schematically depicts one embodiment of the Message Processing Module 24. As shown, in this embodiment the Message Processing Module 24 comprises a Message Processor Bridge (MPB) 30, a microprocessor 32 with an external cache 34 (e.g., a PowerPC 620 with external L2 (Level 2) cache), and a Network Interface Unit (NIU) 36 coupled to a link 14. The NIU 36 and cache 34 are coupled to the microprocessor 32 by a cache interface 38. The NIU 36 is used to send packets between nodes via the Fat Tree network 10 (FIG. 1). Among other things, the microprocessor 32 is used to execute basic message passing. The MPB 30 interfaces the microprocessor 32 to the Memory Controllers 20 (MC0, MC1) and the Message ACK Bus.

The present invention was made in designing an interface permitting low latency message passing between the Message Processing Module 24 (i.e., the microprocessor 32) and link 14. In the specific application discussed above and depicted in FIGS. 1–3, the invention is employed in the Network Interface Unit 36 to provide a low latency interface between the microprocessor 32 and the links 14 connecting the nodes 12 to the Fat Tree network 10.

SUMMARY OF THE INVENTION

The present invention provides a low latency interface that permits a microprocessor to issue commands and immediately read the results of those commands. Important features of the invention include memory mapped cache line based Read and Write Windows, and supporting hardware and software providing a low latency command/response mechanism that makes command results available immediately to the next cache line read operation that addresses the Read Window. The presently preferred embodiment of the invention (a) permits the optional use of additional cache lines beyond Cache Line 0; (b) employs novel formats for the Command, Status, and Command Specific fields of the Write and Read Windows; (c) employs an "RBH" field in the Read Window to automatically provide the expected red/black, or "RB," bit value to a device reading the Read Window; and (d) employs a novel interpretation of a zero Command field in the Write Window.

As mentioned, the RBH field contains an expected value in the Command field of the Write Window (e.g., the expected RB value). The RB field is used to commit a new command and its data for execution. For example, a command is committed and RBH toggles when the following conditions are met: an L2 cache write to the Command word of the Write Window occurs, the Command field is non-zero, and the RB bit matches RBH. In the preferred embodiment, software can zero the Network Interface Unit cache line without fear of a cache line displacement causing a command to be issued, even if a "0" matches the expected RB commit value. The microprocessor is not required to memorize the RB value when it issues a command, because the RBH field automatically provides the expected RB bit value upon a read from the Read Window. This is advantageous because, without the RBH field, the software would have to remember the setting of the RB bit so that it could correctly toggle this bit when the command is issued. It also provides a mechanism whereby the operating system can determine the command issue state of the low latency interface to support multiplexing the use of the interface among multiple processes.

Without an RBH field, an operating system would have a much more difficult time sharing a low latency interface among multiple processes. This is because the operating system would not be able to directly determine the command issue state of the hardware that should be restored for that process. For instance, if the RBH field did not exist, each process would maintain its own RBH value. As a process issues commands, it would have to update its RBH value to stay consistent with the hardware's command issue state. Therefore, two processes sharing the same low latency interface would often have different RBH values. As the operating system switches the processor to a new process, it should guarantee that the command issue state of the low latency interface matches the expected RBH value of the process being activated. Without this guarantee, the next command issued by the process may not actually be performed, since the RB value issued by the software may not match the command issue state expected by the hardware.

The presently preferred embodiment of the invention is described below with reference to a specific microprocessor (i.e., the PowerPC 620); however, the invention may be practiced with other microprocessors providing an interface or bus allowing burst transfers of a cache line between the microprocessor and the Network Interface Unit.

Other features of the invention are disclosed below.

DETAILED DESCRIPTION OF PREFERRED EMBODIMENTS

I. Overview

Figure 1:
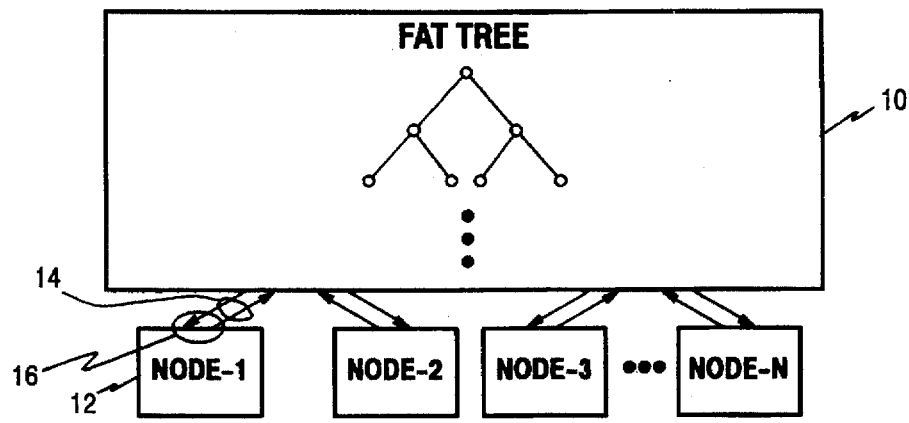
FIG. 1 schematically depicts one embodiment of a parallel computing system.
Figure 2:
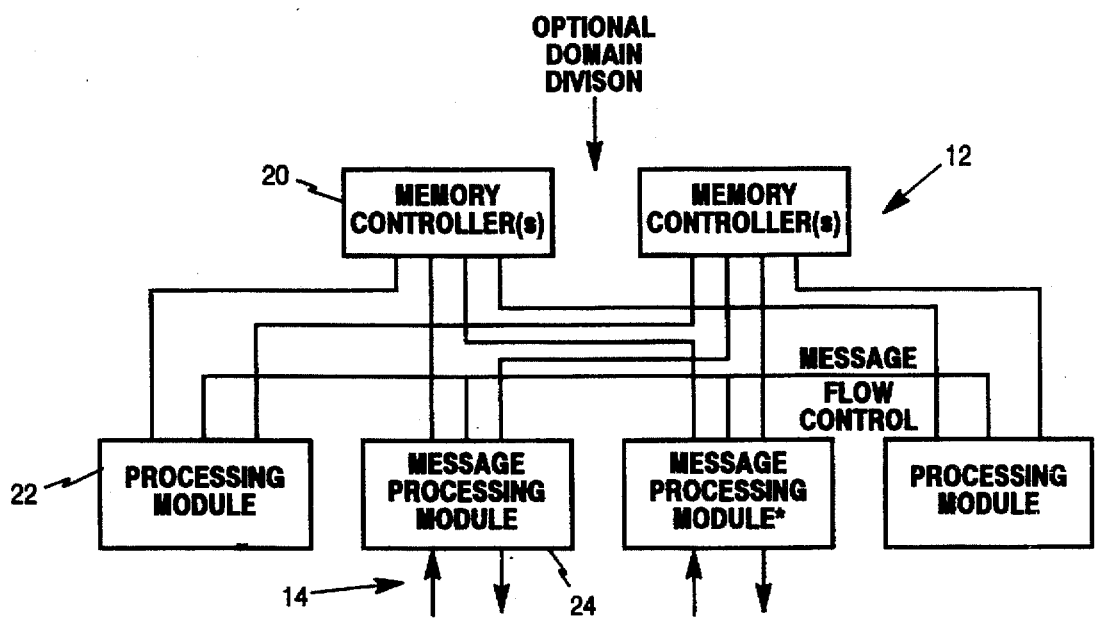
FIG. 2 schematically depicts one embodiment of a node of the parallel computing system of FIG. 1.
Figure 3:
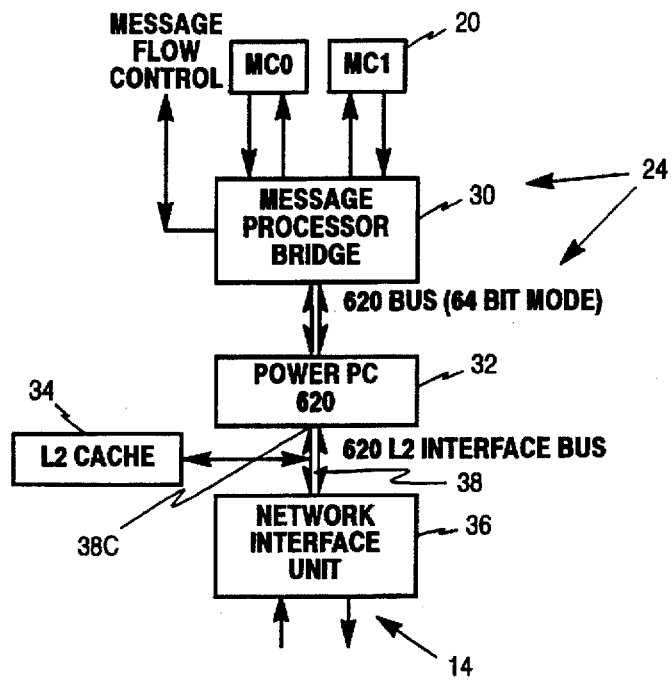
FIG. 3 schematically depicts one embodiment of a Message Processing Module of the node of FIG. 2.

Active-messaging architectures require a low latency mechanism for creating and dispatching "microthreads," defined as a system specific description of a unit of work to be executed on a node, which often causes the transmission of a message to another node in order to schedule the work for execution. In the embodiment of the present invention described below, the active-messaging hardware includes a microprocessor 32 attached to a Network Interface Unit 36 (FIG. 3). The invention provides a low latency software and hardware interface between the microprocessor 32 and Network Interface Unit 36, which results in a low latency interface between the microprocessor 32 and the Fat Tree network 10 (FIG. 1). Copending application Ser. No. 08/428,684, titled "Methods and Apparatus For Exchanging Active Messages in a Parallel Processing Computer System," filed Apr. 25, 1995, discloses details of preferred embodiments of the active messaging thread descriptors.

In the presently preferred embodiment of the invention, the Network Interface Unit 36 is coupled to the microprocessor's L2 (Level 2) cache interface. This interface provides burst transfers of cache lines (64 bytes) between the microprocessor 32 and Network Interface Unit. The Network Interface Unit 36 is memory mapped into the microprocessor's address space, so the microprocessor can write to and read from the NIU as if it were memory. Two memory mapped cache lines are used to write commands to the Network Interface Unit's Write Window (see FIG. 4) and another two cache lines are used to read results of the commands from the Network Interface Unit's Read Window. In the preferred embodiment, software is responsible for ensuring that the Write Window is transferred from the L1 cache to the Network Interface Unit. Software is also responsible for removing stale Read Window data from the cache before reading new results. The microprocessor 32 provides a flush instruction (e.g., the "dcbf" instruction of the PowerPC 620) suitable to these ends.

A PowerPC processor directly supports two caches: level 1 (L1) and level 2 (L2). The L1 cache is physically packaged as part of the Power PC microprocessor and provides the fastest access. The microprocessor incorporates the L2 interface pins for attaching additional cache. The microprocessor also has a system memory interface. The L1 and L2 caches are used to improve processor performance. The caches hold copies or modified copies of system memory data. The microprocessor hardware uses the MESI (Modified, Exclusive, Shared, Invalid) protocol on the system memory interface to maintain cache consistency between multiple processing elements sharing the system memory. When software makes memory references, the caches are interrogated to determine if the processor has a copy of the requested data. If so, the cached data is used; otherwise, the processor requests the data via the system memory interface. When the data arrives, an L1 cache line is employed to hold the data. As memory operations are performed, cache line conflicts may arise, so the processor 32 may resolve the conflict by moving an L1 cache line that has not been referenced recently out to the larger L2 cache via connection 380. This replacement policy also affects how data stored in the L2 cache is eventually returned to system memory. In a similar fashion, L2 data can be moved back into the L1 cache.

The preferred embodiment of the NIU is implemented as a PowerPC 620 coprocessor device. The coprocessor devices are given a unique address range on the L2 interface. Therefore, coprocessor memory references never appear on the system memory interface, since the data for that memory address range always appears as though it is cached in the L2 cache.

As software makes references to coprocessor memory, cache lines in the L1 cache are allocated to hold the data being read or modified. The modifications to the L1 cache lines are not directly visible on the L2 cache interface until the microprocessor explicitly moves those cache lines back out to the L2 cache.

The microprocessor instruction architecture includes cache control instructions, typically the "dcbf" (data cache block flush) instruction is the most useful to this application. For example, when software accesses the Read Window, the processor will copy the Read Window contents from the L2 cache (i.e., the coprocessor's memory mapped space) into an L1 cache line. Subsequent reads of the Read Window address space will be returned from the L1 cache line copy as long as the L1 cache line copy remains in the L1 cache (i.e., the NIU has no way to tell the microprocessor that the Read Window address space copy in L1 is out of date). Therefore, when software issues a command to the NIU, it must invalidate any L1 cache line copy of the Read Window so that the microprocessor will fetch the updated Read Window contents from the L2 coprocessor. The "dcbf" instruction provides a mechanism to invalidate an L1 cache line associated with a particular memory address. The "dcbf" instruction is also used to push data back out into the L2 address space. For example, when the software builds a command to send to the NIU, a copy of the Write Window cache lines are automatically fetched from the coprocessor by the microprocessor. The software makes changes to the cache lines and the changes are recorded in the L1 cache line copies. Normally, the microprocessor would retain the L1 cache copies until those cache lines needed to be re-used (i.e., cache line replacement policy). However, this would cause significant delay in a command being physically issued. The "dcbf" instruction causes the data associated with a dirty (i.e., modified contents) cache line to be written back out to the L2 cache interface and the L1 cache copy to be invalidated. Software is responsible for issuing the "dcbf" instructions, because the coprocessor (NIU) cannot directly see the modifications that the software is making to the co-processor's address space until such time that the data actually appears on the L2 interface.

Regarding the necessity of the RB bit: Software does not control the cache line replacement algorithm used by the underlying processor. A set of instructions might cause several displacements (i.e., write backs) and replacements (read backs) of L2 data. Therefore, there is no guarantee that a sequence of instructions that modifies a cache line will appear only as a single L2 interface transaction. Thus, the RB bit is needed in order for the coprocessor to determine when all the transactions have completed. The RB bit changes state so that it can distinguish implicit displacements from the software initiated displacements (i.e., via "dcbf") used to commit a command for execution. The last modification software makes before issuing the "dcbf" instruction is to modify the RB bit to match the expected RBH value.

Figure 4:
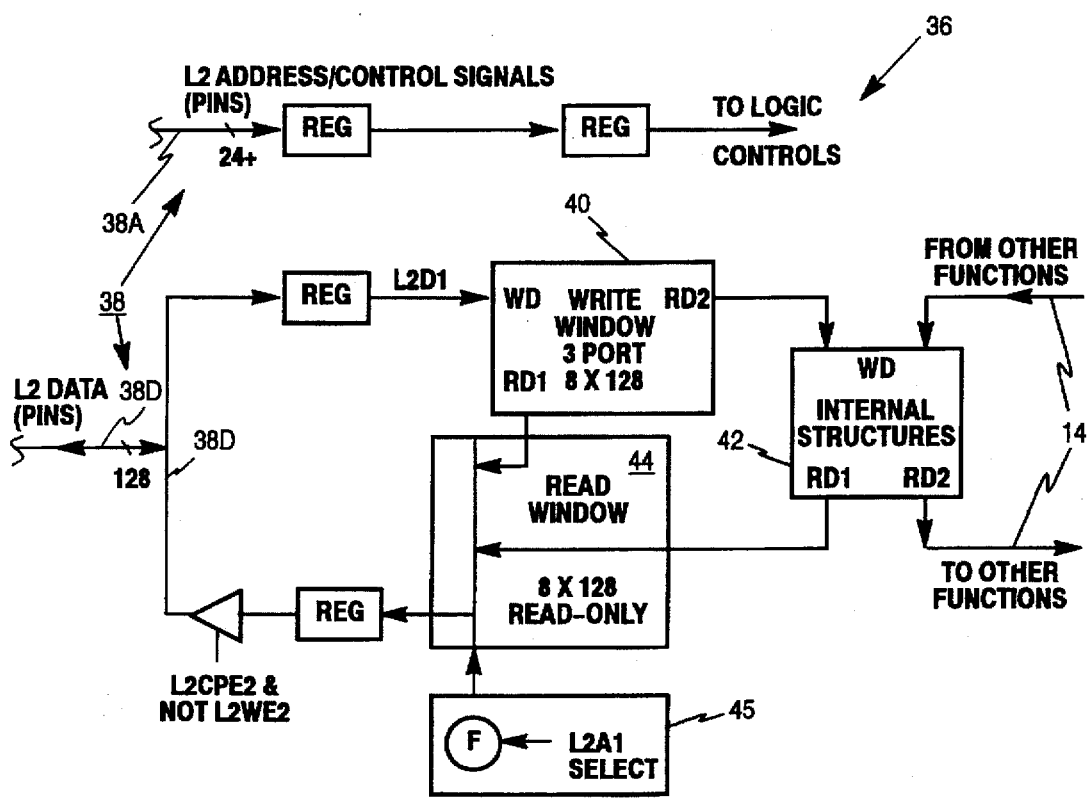
FIG. 4 schematically depicts a Network Interface Unit in accordance with the present invention.

FIG. 4 schematically depicts one presently preferred embodiment of the Network Interface Unit 36. This diagram shows the basic structure of the Read and Write Windows and associated interfaces, including the L2 cache interface 38 and the interface to the Internal Structures 42. The Internal Structures block 42 represents circuitry that may be written to from either the Write Window 40 or other functions via link 14 and the "WD" port, and may be read into the Read Window 44 or other functions via the "RD" port. Thus, references to the Network Interface Unit 36 "executing" a command mean that logic within the NIU is performing the function defined by its architecture for the specified command. Often this results in changes to both the architecturally visible state as well as implementation specific internal structures.

The L2 Interface includes "L2Data" line 38; and "L2Address/Control." line 38A "L2Data" provides the read/write data from/to the Network Interface Unit 36. A cache line (64 bytes) is transferred on 4 successive clocks on "L2Data," at a rate of 16 bytes per clock. "L2Address/Control" provides the address of the specific word within the Read/Write Window being transferred and also provides information about whether this is a read or write operation directed to the NIU. Due to the timing of the L2 Interface 36, the data must be registered (see the "reg" blocks) into and out of the Network Interface Unit. The "L2Address/Control" pins are double registered ("reg") to provide delayed control functions.

The Write Window 40 is a three port register file composed of eight locations deep by 128 bits wide. Data 128 bits wide is written via "L2D1" into the port marked "WD." Data may be read simultaneously from the two read ports "RD1" and "RD2." The "RD1" port is used during read operations to the Write Window, while "RD2" is used during command execution to move data to the Internal Structures block 42.

The Read Window 44 is actually a 2-1 multiplexor that is 128 bits wide. Logically the Read Window is 8 deep by 128 bits wide. On a read operation where the "L2Address" indicates Write Window, the select function ("F") 45 will select data from the Write Window 40 port "RD1." Otherwise, if the "L2Address" indicates Read Window 44, the select function will select data from the Internal Structures 42.

II. Write Window

The preferred layout of the Write Window is shown below. The content of the Write Window is dependent on the command written to it. However, the location of the Command field is fixed. Most commands can be issued using only Cache Line 0. Cache Line i is used to pass additional data that will not fit in Cache Line 0. The Write Window is readable, such that reads from it return data previously written.

|  | Page Offset | WRITE WINDOW | |
|---|---|---|---|
| Cache Line 0 | 0 × 80 | Command RB | Command Specific |
|  | 0 × 90 | Command Specific | Command Specific |
|  | 0 × A0 | Command Specific | Command Specific |
|  | 0 × B0 | Command Specific | Command Specific |
| Cache Line 1 | 0 × C0 | Command Specific | Command Specific |
|  | 0 × D0 | Command Specific | Command Specific |
|  | 0 × E0 | Command Specific | Command Specific |
|  | 0 × F0 | Command Specific | Command Specific |

The Command field specifies the Network Interface Unit 36 command to be executed and contains the RB (red/black) bit. The RB bit is used to commit a new command (and its associated data) for execution by the Network Interface Unit 36. A command is committed and the RBH field toggles when the following conditions are met: an L2 cache write to the Command word of the Write Window occurs, the Command field is non-zero (this allows the software to zero the Network Interface Unit cache line (i.e., with the "dcbz" instruction) without fear of a cache line displacement causing a command to be issued (even if a 0 matches the expected RB commit value)), and the RB bit matches RBH.

In order to avoid a race condition with the hardware, the software does not store commands into the Command field until it has completed stores for the other fields. This is discussed below with reference to FIG. 5.

III. Read Window

The layout of the Read Window is shown below. Like the Write Window format, the format of the Read Window is dependent on the command. However, the Status field is always available in a fixed location. Most command results can be obtained by reading only Cache Line 0. Cache Line 1 is used to obtain additional data that does not fit in Cache Line 0. Once software has committed a command, the command results are available on the next Read Window access. The Network Interface Unit 36 ignores writes to the Read Window.

|  | Page Offset | READ WINDOW | |
|---|---|---|---|
| Cache Line 0 | 0 × 00 | Status RBH | Command Specific |
|  | 0 × 10 | Command Specific | Command Specific |
|  | 0 × 20 | Command Specific | Command Specific |
|  | 0 × 30 | Command Specific | Command Specific |
| Caahe Line 1 | 0 × 40 | Command Specific | Command Specific |
|  | 0 × 50 | Command Specific | Command Specific |
|  | 0 × 60 | Command Specific | Command Specific |
|  | 0 × 70 | Command Specific | Command Specific |

The Status field contains the expected RB commit value field (RBH) and various flow control counts. The RBH field is available through the Read Window as an optimization and for context switching.

According to the invention, all commands update the Status field. The Status and Command Specific fields stay frozen (with the same values) until the next command is issued. Commands that do not have explicitly defined results (other than the Status field) will not modify the other fields in the Read Window.

Software is not required to read the Status field in order to send or complete the execution of a command. Software can maintain its own status information in parallel with the Network Interface Unit 36 in order to improve performance. Software may issue multiple commands back to back without any intervening read of the Read Window.

One exemplary hardware implementation of the Read and Write Window mechanisms in the Network Interface Unit 36 is shown in FIG. 4. A key feature to note is that, in this embodiment, the Read Window is actually a multiplexor which "exposes" the appropriate internal structure into the Read Window. This approach allows a command to be executed in minimum time, such that command results are available immediately to the next L2 cache read operation that addresses the NIU.

IV. Writing and Reading to/from the NIU

Figure 5:
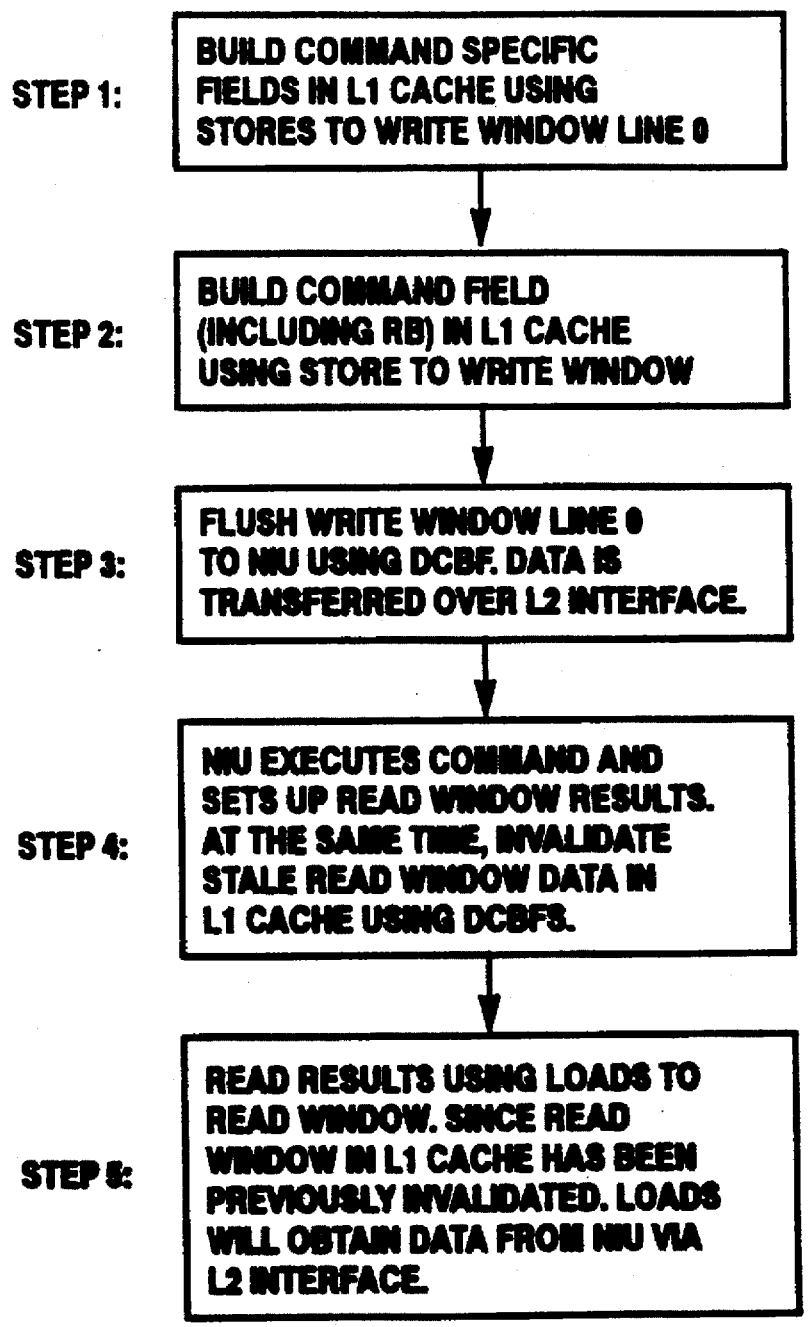
FIG. 5 is a flowchart of a process for issuing a command to the Network Interface Unit and reading the results of the command.

The microprocessor 32 (FIG. 3) communicates with the Network Interface Unit 36 by writing and reading cache lines, insuring the correct data movement across the L2 interface 38. The following two codestream examples show how this is performed with PowerPC 620 instruction mneumonics, although, of course, the algorithm could be applied to other microprocessors. FIG. 5 is a flowchart corresponding to Codestream 1 below.

Codestream 1: Issue 64 byte Network Interface Unit command and read 128 byte result

| | | |
|---|---|---|
| std | g16, 0(g27) | /store command for NIU |
| dcbf | 0, g27 | /store L1 write window copy into L2 |
| ld | g3, 0(g27) | /force next dcbf (flush) to wait |
| | | /read window contents updated by new |
| | | /command, so invalidate L1 |
| dcbf | 0, g28 | /invalidate L1 read_window copy, L1 |
| | | /copy NOT dirty |
| dcbf | 64, g28 | /invalidate rest of read_window |
| | | /copy, L1 copy NOT dirty |
| | | /read results from NIU |
| lwz | g4, 0(g28) | /results from read cache line 0 |
| lwz | g2, 64(g28) | /results from read cache line 1 | the L2 interface 38 (FIG. 3) to the Network Interface Unit's Write Window. In step 4, the Network Interface Unit 36 executes the command in the Command field of the Write Window, and sets up the result of the command in the Read Window. In addition, the flush instruction (dcbf) is employed to invalidate stale Read Window data in the L1 cache. Finally, in step 5 the result is read from the Read Window using a load instruction. Since the Read Window in the L1 cache has been invalidated, the load results in data being taken from the Network Interface Unit 36 via the L2 interface 38 (FIG. 3).

Codestream 2: Issue 128 byte Network Interface Unit command and read 64 byte result

| | | |
|---|---|---|
| std | g4, 64(q27) | /store additional parameters for |
| | | /command into write cache line 1 |
| dcbf | 64, g27 | /store L1 write_window cache line 1 |
| | | /copy intp NIU |
| ld | g3, 64(g27) | /force next dcbf to wait |
| std | g10, 0(g27) | /store command for NIU |
| dcbf | 0, g27 | /store L1 write_window cache line 0 |
| | | /copy into NIU |
| ld | g3, 0(g27) | /force next dcbf to wait |
| | | /read window contents updated by new |
| | | /command, so invalidate L1 |
| dcbf | 0, g28 | /invalidate L1 read_window copy, L1 |
| | | /copy NOT dirty |
| ld | g3, 0(g28) | /read results from NIU |

The following tables show the minimum latency on the L2 interface (13 clocks) for each codestream. The actual latency will depend on the capabilities of the microprocessor 32 (or other device) driving the hardware interface.

Codestream 1 Latency:

| Clock | 0 | 1 | 2 | 3 | 4 | 5 | 6 | 7 | 8 | 9 | 10 |
|---|---|---|---|---|---|---|---|---|---|---|---|
| L2 Data | W0 | W1 | W2 | W3 | | R0 | R1 | R2 | R3 | R4 | R5 |
| Clock | 11 | 12 | 13 | 14 | 15 | 16 | 17 | 18 | 19 | 20 | |
| L2 Data | R6 | R7 | | | | | | | | | |

Codestream 2 Latency:

| Clock | 0 | 1 | 2 | 3 | 4 | 5 | 6 | 7 | 8 | 9 | 10 |
|---|---|---|---|---|---|---|---|---|---|---|---|
| L2 Data | W0 | W1 | W2 | W3 | W4 | W5 | W6 | W7 | | R0 | R1 |
| Clock | 11 | 12 | 13 | 14 | 15 | 16 | 17 | 18 | 19 | 20 | |
| L2 Data | R2 | R3 | | | | | | | | | |

Key: Wn: Write to Write Window offset n
Rn: Read to Read Window offset

Referring to FIG. 5, step 1 involves the use of stores to the Write Window cache line 0 to build the Command Specific fields in the L1 cache. In step 2, the Command field is built with stores to the Write Window. The RB bit is set in this step. (The first source statement of the above assembly language codestream performs steps 1 and 2. The actual building of the Command Specific and Command fields is not shown in the codestream, i.e., there would be instructions that moved data into the g16, g17, g18 and g19 registers before the first instruction). In step 3, the Write Window line 0 is flushed to the Network Interface Unit using the flush, or "dcbf", instruction. Data is thus transferred over

V. Implementation Details

This section provides details of the manner in which software can communicate with the Network Interface Unit 36 hardware, and is sufficient to enable one skilled in the art to write software routines to control the Network Interface Unit.

Interface Overview

As discussed above, the Network Interface Unit 36 interfaces to the microprocessor 32 via the microprocessor's L2 cache interface. The microprocessor cache line size is 64 bytes, and the L2 interface is 16 bytes wide. Four L2 data transfers are required to read/write a cache line. The minimum data transfer between the microprocessor 32 and the Network Interface Unit 36 is one cache line.

The Network Interface Unit 36 is memory mapped into the microprocessor's address space on 4K boundaries. A UNIX application will obtain access to the Network Interface Unit 36 by issuing an IO request to map the Network Interface Unit's data structure into a virtual page for that application.

The behavior of the L2 interface requires an unusual software/hardware interface definition for sending commands and data to the Network Interface Unit 36. One can expect an L1 cache line copy of the Network Interface Unit 36 state to be displaced (i.e., written back) without explicit software control. One can also expect L2 cache reads to terminate early and L2 cache writes to be interrupted for the microprocessor 32 to maintain cache coherency with memory requests on the L3 interface. The L3 interface is the system memory interface described above (the system memory interface can be thought of as the level 3 cache interface, since it is possible to design a memory controller on the system memory interface that has a cache, which becomes the 3rd level of cache to a microprocessor).

Network Interface Unit Cache Interface

The software interface to the Network Interface Unit 36 is via 4 cache lines. Two of the cache lines are read only (via the Read Window). The other two cache lines are read/write (via the Write Window). The Write Window is used to send commands and data to the Network Interface Unit. The Read Window is used to read the results of the command.

Software is responsible for making sure that commands and data get transferred from the L1 cache to the Network Interface Unit. Software is also responsible for removing stale results from the L1 cache before referencing new results. The PowerPC architecture defines instructions (e.g., dcbf) which are suitable to these ends. The PowerPC storage mode for the Network Interface Unit 36 address space is WIM=000 (copy-back, cacheable, no coherence).

Most commands can be issued with a single cache line write. The additional read/write cache line is used for context switching and to pass local parameter data for remote µthread forks that will not fit in the first cache line.

Most command results can be retrieved with a single cache line read. The additional read cache line is used for context switching and to retrieve local parameter (LOCAL_PARAMETER) data for remote µthreads that will not fit in the first cache line.

To provide multi-tasking protection of the kernel Network Interface Unit state, the Write Window responds to two different L2 page addresses. One address is used for kernel mode commands, and the other address is used for user mode commands. Kernel commands issued to the user page are treated as no-ops, and will generate a protect violation interrupt if enabled. User commands may be issued to the user page or the kernel page.

The Network Interface Unit 36 decodes the Power PC L2 Coprocessor Enable signal and six of the sixteen L2 Address signals. (Note that, in this embodiment, the NIU is the coprocessor, and "L2CPEn" is the L2 Coprocessor Enable signal.) The Network Interface Unit 36 is selected when the L2 Coprocessor Enable signal and one of the L2 Address bits are both "1". One L2 Address bit is used to select the user or kernel page. One bit selects either the Read or Write Window. One bit selects a cache line within the window, and two bits are used to select a quad word (128 bit) within a cache line. The L2 Coprocessor Enable signal is asserted by the PowerPC for physical addresses 0x8000000000 and above.

An example mapping is provided below:

$L2A_0$ is part of the chip select logic.

$L2A_1$ selects user or kernel page (0=user, 1=kernel).

$L2A_{12}$ selects Read or Write Window (0=Read Window, 1=Write Window).

$L2A_{13}$ selects cache line within window (0=cache line 0, 1=cache line 1).

$L2A_{14:15}$ selects the quad word within the cache line.

Note that the lower four bits of the physical address do not appear on the L2 interface.

| Window | Physical Address | L2 Address Signal Decode |
| --- | --- | --- |
|  |  | 0000000000111111 |
|  |  | 0123456789012345 |
| User/Kernel Read Window | 0x8000080000-0x800008007F | 0b10xxxxxxxx0xx... |
| User Write Window | 0x8000080080-0x80000800FF | 0b10xxxxxxxx1xx... |
| Kernel Write Window | 0x80000C0080-0x80000C00FF | 0b11xxxxxxxx1xx... |

Other mappings may be chosen in order to avoid addressing conflicts with other L2 coprocessors.

To avoid a race condition with the hardware, the software should not store into the Command and RB fields until it has completed stores for the Command Specific fields. If a command uses Command Specific fields in cache line 1, then it must be written and flushed prior to the commit of cache line 0.

The Read Window may directly expose the contents of a receive or transmit buffer. However, the Write Window is treated as storage space separate from the receive and transmit buffers, since it must always be possible to send a command even if there are no free buffers. The Network Interface Unit 36 automatically copies data out of the Write Window into its other internal buffers and registers as required by the command. It is acceptable for the Network Interface Unit 36 hardware to prefetch data from the Write Window cache lines into a free transmit buffer prior to the actual commit to meet interface timing requirements, as long as the architectural model is preserved. The Network Interface Unit 36 may implement this mechanism by revealing one less than the actual number of transmit buffers to software. If the Network Interface Unit 36 implements extra transmit buffers, then the fork overflow conditions must still be based on the buffer counts revealed to software and not on the actual number of internal transmit buffers.

Finally, the present invention may be employed in other specific forms without departing from the spirit or essential attributes thereof. Accordingly, reference should be made to the appended claims rather than to the foregoing specification as indicating the true scope of the invention.

We claim:

1. A method for interfacing a microprocessor and internal structures of an interface unit, said microprocessor providing burst transfers of a cache line to a cache interface, comprising the steps of:

(a) writing to a memory-mapped cache line based Write Window comprising a write port and first and second read ports;

(b) reading from a memory-mapped cache line based Read Window coupled to a read port of said internal structures and to said Write Window, said Read Window selectively exposing said Write Window or said internal structures when said microprocessor reads said Read Window, and (c) selectively coupling said Write Window or said internal structures to said Read Window for transfer of a cache line to said cache interface.

2. A method as recited in claim 1, wherein said Write Window is configured to be the size of two cache lines and contains a Command field, an RB field, and a plurality of Command Specific fields, and the Command field specifies a command to be executed, so that the RB field is toggled when a new command is committed for execution, and the Command Specific fields are employed to pass parameters or operands for a command to the interface.

3. A method as recited in claim 2, wherein said Read Window is configured to be the size of two cache lines and contains a Status field, an RBH field, and a plurality of Command Specific fields, and the Status field contains information indicative of the status of resources; and the RBH field contains an expected value in the Write Window and is toggled when a new command is committed for execution.

4. A method as recited in claim 3, wherein the RBH field is toggled when the following conditions are met: a cache write to the Command field of the Write Window occurs, the Command field is non-zero, and a prescribed bit in the Write Window matches the RBH field.

5. A massively parallel, high speed computer system comprising an interconnecting network; a plurality of nodes each containing one or more processors; and a plurality of links connecting the nodes to the interconnecting network; wherein each of said nodes comprise, in addition to said processor(s), a network interface unit comprising: internal structures; a memory mapped cache line based Write Window comprising a write port and first and second read ports, said write port being operatively coupled to said processor (s) and said second read port being coupled to said internal structures; and a memory mapped cache line based Read Window operatively coupled to a read port of said internal structures and to said first read port of said Write Window, said Read Window comprising means for selecting said Write Window or said internal structures when said processors(s) read(s) said cache line through said Read Window.

6. A computer system as recited in claim 5, wherein each of said processors provides burst transfers of a cache line to a cache interface.

7. A computer system as recited in claim 5, wherein said Read Window comprises a multiplexor controllable to select between said Write Window and said internal structures.

8. A computer system as recited in claim 5, wherein said Write Window is configured to be the size of two cache lines and contains a Command field and a plurality of Command Specific fields, and wherein the Command field specifies a command to be executed and the Command Specific fields are employed to pass parameters or operands for a command to the interface.

9. A computer system as recited in claim 8, wherein said Read Window is configured to be the size of two cache lines and contains a Status field, an RBH field, and a plurality of Command Specific fields, wherein the Status field contains information indicative of the status of resources; and the RBH field contains an expected value in the Write Window, and is toggled when a new command is committed for execution.

10. A computer system as recited in claim 9, wherein the RBH field toggles when the following conditions are met: a cache write to the Command field of the Write Window occurs, the Command field is non-zero, and a prescribed bit in the Write Window maches the RBH field.

11. A computer system as recited in claim 10, wherein said Read Window comprises a multiplexor controllable to select between said Write Window and said internal structures.

12. A computer system as recited in claim 11, wherein each of said processors provides burst transfers of a cache line to a cache interface.

* * * * *